(12) United States Patent
Chen et al.

(10) Patent No.: US 7,610,792 B2
(45) Date of Patent: Nov. 3, 2009

(54) SLED BUCK TESTING SYSTEM

(75) Inventors: Weigang Chen, Canton, MI (US); Michael Stiyer, Grosse Pointe Farms, MI (US); Baohua Xiao, Canton, MI (US); Robert MacFarland, Troy, MI (US); Matthew Maltarich, Dearborn Heights, MI (US)

(73) Assignee: Ford Motor Company, Dearborn, MI (US)

( * ) Notice: Subject to any disclaimer, the term of this patent is extended or adjusted under 35 U.S.C. 154(b) by 165 days.

(21) Appl. No.: 11/565,860

(22) Filed: Dec. 1, 2006

(65) Prior Publication Data
US 2008/0121014 A1 May 29, 2008

Related U.S. Application Data

(60) Provisional application No. 60/821,859, filed on Aug. 9, 2006, provisional application No. 60/821,862, filed on Aug. 9, 2006.

(51) Int. Cl.
*G01M 7/00* (2006.01)

(52) U.S. Cl. ..................................... 73/12.04

(58) Field of Classification Search ................ 73/865.3, 73/12.04, 865.6
See application file for complete search history.

(56) References Cited

U.S. PATENT DOCUMENTS

| | | | | |
|---|---|---|---|---|
| 5,483,845 A | * | 1/1996 | Stein et al. | 73/865.3 |
| 5,929,348 A | * | 7/1999 | Stein et al. | 73/865.3 |
| 6,256,601 B1 | * | 7/2001 | Wipasuramonton et al. | 703/8 |
| 6,622,541 B2 | * | 9/2003 | Stein et al. | 73/12.04 |
| 7,373,801 B2 | * | 5/2008 | Friedman et al. | 73/12.06 |
| 2002/0050179 A1 | | 5/2002 | Buescher et al. | |

OTHER PUBLICATIONS

Non-final Office Action (mailed Apr. 30, 2009) issued in U.S. Appl. No. 11/565,855.

* cited by examiner

*Primary Examiner*—Lisa M Caputo
*Assistant Examiner*—Octavia Davis
(74) *Attorney, Agent, or Firm*—Frank A. MacKenzie; Brooks Kushman P.C.

(57) ABSTRACT

A sled carriage is configured to move in a direction of an axis and a track is attached with the sled carriage. A platform is attached with the track and a sled buck is attached with the platform. Upon acceleration of the sled carriage, the sled buck and platform move relative to the sled carriage.

15 Claims, 12 Drawing Sheets

SLED BUCK TESTING SYSTEM

CROSS-REFERENCE TO RELATED APPLICATIONS

This application claims the benefit of U.S. provisional application Ser. No. 60/821,859 filed Aug. 9, 2006, and U.S. provisional application 60/821,862 filed Aug. 9, 2006.

This application is related to an application filed concurrently also entitled "Sled Buck Testing System," application Ser. No. 11/565,855, the contents of which are incorporated in their entirety by reference herein.

BACKGROUND OF THE INVENTION

1. Field of the Invention

The invention relates to sled buck testing systems.

2. Background Discussion

A vehicle experiencing an impact barrier test, where the barrier is at an angle relative to the direction of motion, e.g., longitudinal motion, of the vehicle, may experience longitudinal deceleration, lateral movement, and yaw movement.

Some sled buck testing systems used to simulate vehicle impact barrier tests may only permit longitudinal movement.

A sled buck testing system is desired that permits lateral movement and yaw movement.

SUMMARY OF THE INVENTION

Embodiments of the invention may take the form of a system for sled buck testing. The system includes a sled carriage configured to move in a direction of an axis, a guide attached with the sled carriage, and a pivot member configured to move along the guide. The system also includes first and second tracks attached with the sled carriage, a circular bearing member having a center of rotation attached with the first and second tracks, and a platform attached with the circular bearing member. The system further includes a sled buck attached with the platform. Upon acceleration of the sled carriage, the sled buck and platform move relative to the sled carriage in a predetermined fashion.

Embodiments of the invention may take the form of a system for sled buck testing. The system includes a sled carriage configured to move in a direction of an axis and a track attached with the sled carriage. The system also includes a platform attached with the track and a sled buck attached with the platform. Upon acceleration of the sled carriage, the sled buck and platform move relative to the sled carriage in a predetermined fashion.

BRIEF DESCRIPTION OF THE DRAWINGS

FIG. 6b shows an assembled perspective view of the track and guide rail sled buck testing system of FIG. 6a.

FIGS. 8a through 8e show models of the movement and the forces acting on the track and guide rail sled buck testing system of FIG. 6a.

FIG. 9b shows an assembled perspective view of the track sled buck testing system of FIG. 9a.

FIGS. 10a through 10d show models of the movement and the forces acting on the track sled buck testing system of FIG. 9a.

DETAILED DESCRIPTION OF EMBODIMENTS OF THE INVENTION

Figure 1B:
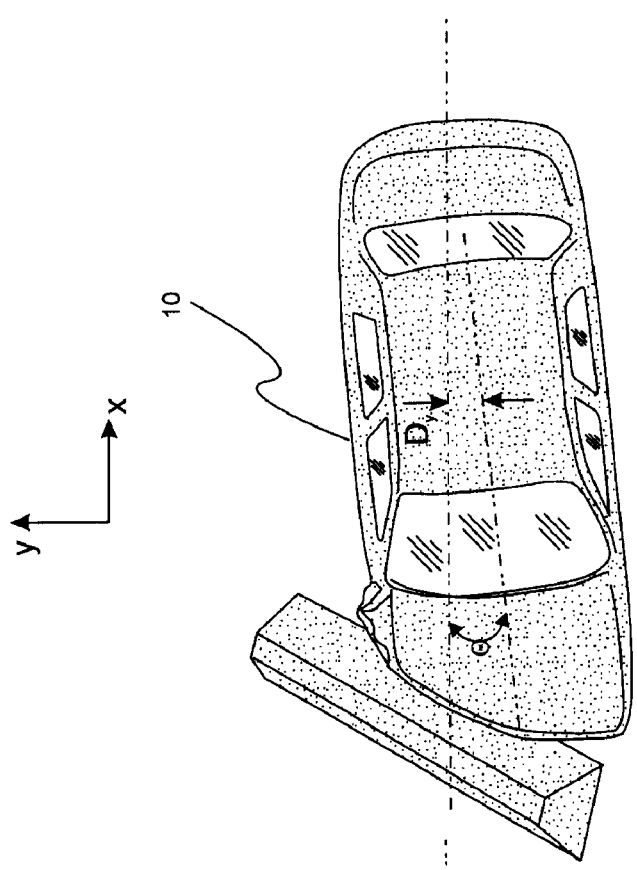
FIGS. 1a and 1b show the movement of a vehicle before and after an impact barrier test.
Figure 1A:
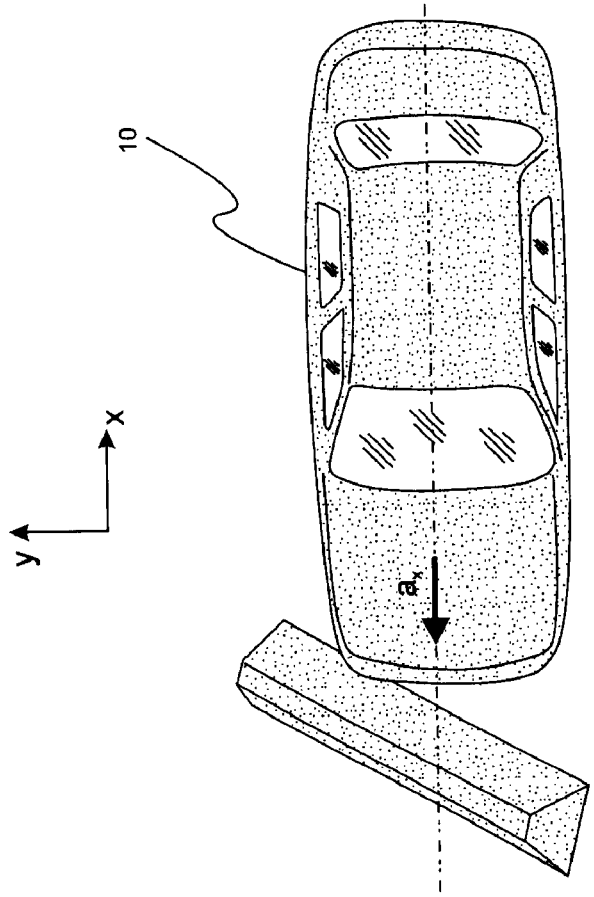

FIG. 1a shows vehicle 10 experiencing longitudinal acceleration, $a_x$, in an X-Y plane prior to a 30 degree impact. FIG. 2a shows that, after impact, vehicle 10 experienced lateral movement, $D_y$, and yaw movement, $\theta$.

Figure 2:
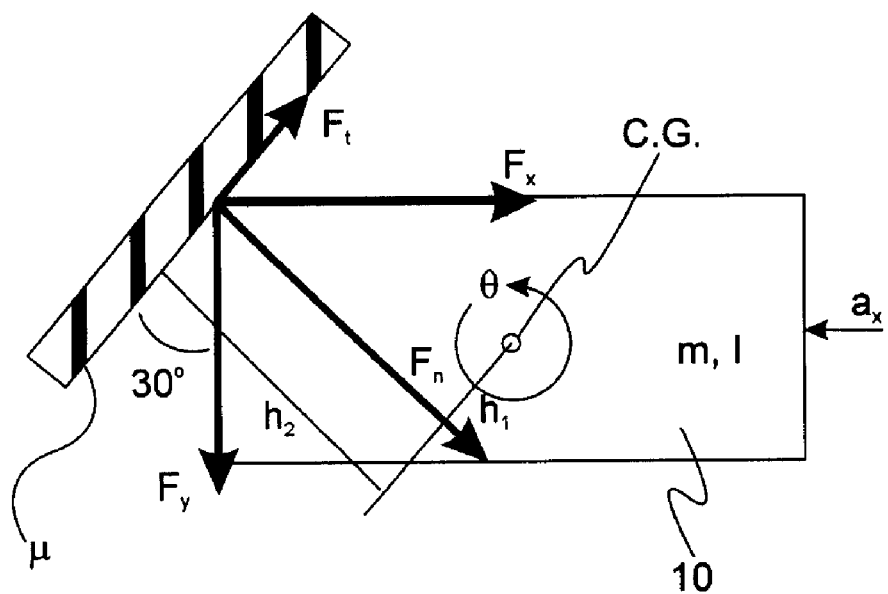
FIG. 2 shows a model of the forces acting on the vehicle of FIGS. 1a and 1b.

FIG. 2 shows a rigid body model of vehicle 10, where

C.G.: Center of gravity
$F_n$: Barrier normal force
$F_t$: Barrier friction force
$F_x$: Force component in X direction
$F_y$: Force component in Y direction
$\mu$: Coefficient of friction
$a_x$: Vehicle longitudinal pulse
$\theta$: Vehicle yaw angle
$h_1$ & $h_2$: Moment arm of $F_n$ and $F_t$ with respect to C.G., and
m & I: Vehicle 10 mass and moment of inertia.

and where $$F_x = F_n \cos 30° + F_t \sin 30° \qquad (1)$$

while $$F_t = \mu F_n \qquad (2)$$

and, $$F_x = ma_x, \; F_y = ma_y. \qquad (3)$$

Thus, $$F_n = \frac{ma_x}{\frac{\sqrt{3}}{2} + \frac{1}{2}\mu}. \qquad (4)$$

The equation of angular motion is given by $$F_n h_1 - F_t h_2 = I\ddot{\theta}. \qquad (5)$$

Substituting (2) and (4) into (5) yields $$(h_1 - \mu h_2) \frac{ma_x}{\frac{\sqrt{3}}{2} + \frac{1}{2}\mu} = I\ddot{\theta}. \qquad (6)$$

Rearranging (6) yields $$\ddot{\theta} = \frac{(h_1 - \mu h_2)m}{\left(\frac{\sqrt{3}}{2} + \frac{1}{2}\mu\right)I} a_x \qquad (7)$$

or $$r\ddot{\theta} = a_x \quad (8)$$

where $$r = \frac{\left(\frac{\sqrt{3}}{2} + \frac{1}{2}\mu\right)l}{(h_1 - \mu h_2)m}.$$

Thus, r is a vehicle 10 dependent constant.

Applying a double integration to (8) yields $$\theta = \int\int \ddot{\theta}\,dt\,dt = \frac{1}{r}\int\int a_x\,dt\,dt. \quad (9)$$

Equilibrium in the Y direction is given by $$F_y = F_n \sin 30° - F_f \cos 30°. \quad (10)$$

Substituting (2) and (4) into (10) yields $$F_y = \frac{\left(\frac{1}{2} - \frac{\sqrt{3}}{2}\mu\right)}{\left(\frac{\sqrt{3}}{2} + \frac{1}{2}\mu\right)} ma_x. \quad (11)$$

Because $$F_y = ma_y, \quad (12)$$

$$a_y = \frac{\left(\frac{1}{2} - \frac{\sqrt{3}}{2}\mu\right)}{\left(\frac{\sqrt{3}}{2} + \frac{1}{2}\mu\right)} a_x. \quad (13)$$

Applying a double integration to both sides of (13) yields $$D_y = \int\int a_y\,dt\,dt = C \int\int a_x\,dt\,dt \quad (14)$$

where $$C = \frac{\left(\frac{1}{2} - \frac{\sqrt{3}}{2}\mu\right)}{\left(\frac{\sqrt{3}}{2} + \frac{1}{2}\mu\right)}. \quad (15)$$

Thus, $$\theta = \frac{1}{r}\int\int a_x\,dt\,dt \quad (16)$$

and $$D_y = C\int\int a_x\,dt\,dt. \quad (17)$$

(16) and (17) describe the motion of vehicle 10 in the X-Y plane, e.g., longitudinal deceleration, lateral motion, and yaw, in terms of one independent degree of freedom, e.g., $a_x$.

Figure 3:
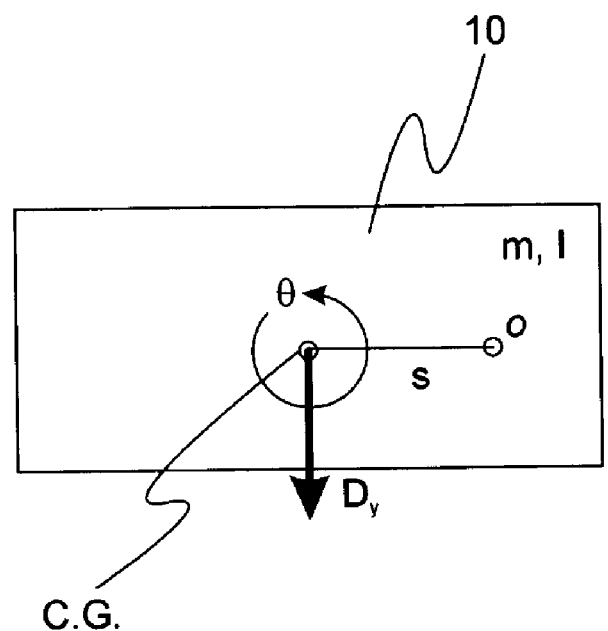
FIG. 3 shows a model of the movement of the vehicle of FIGS. 1a and 1b.

FIG. 3 shows a rigid body model of vehicle 10 using notations described for FIG. 2 and where s: Distance between the instantaneous center of rotation, o, and the C.G.

At the C.G., the lateral velocity and angular velocity can be obtained by $$V_y = C\int a_x\,dt \quad (18)$$

and $$\dot{\theta} = \frac{1}{e}\int a_x\,dt. \quad (19)$$

At the instantaneous center of rotation, o, $$V_y = s\dot{\theta}. \quad (20)$$

Thus, $$s = rC. \quad (21)$$

Substituting C and r into (21) leads to $$s = \frac{\left(\frac{1}{2} - \frac{\sqrt{3}}{2}\mu\right)l}{(h_1 - \mu h_2)m}. \quad (22)$$

The validity of (16) and (17), as well as the values for r and C, can be determined experimentally by, for example, analyzing barrier vehicle response or structural CAE data.

Figure 4:
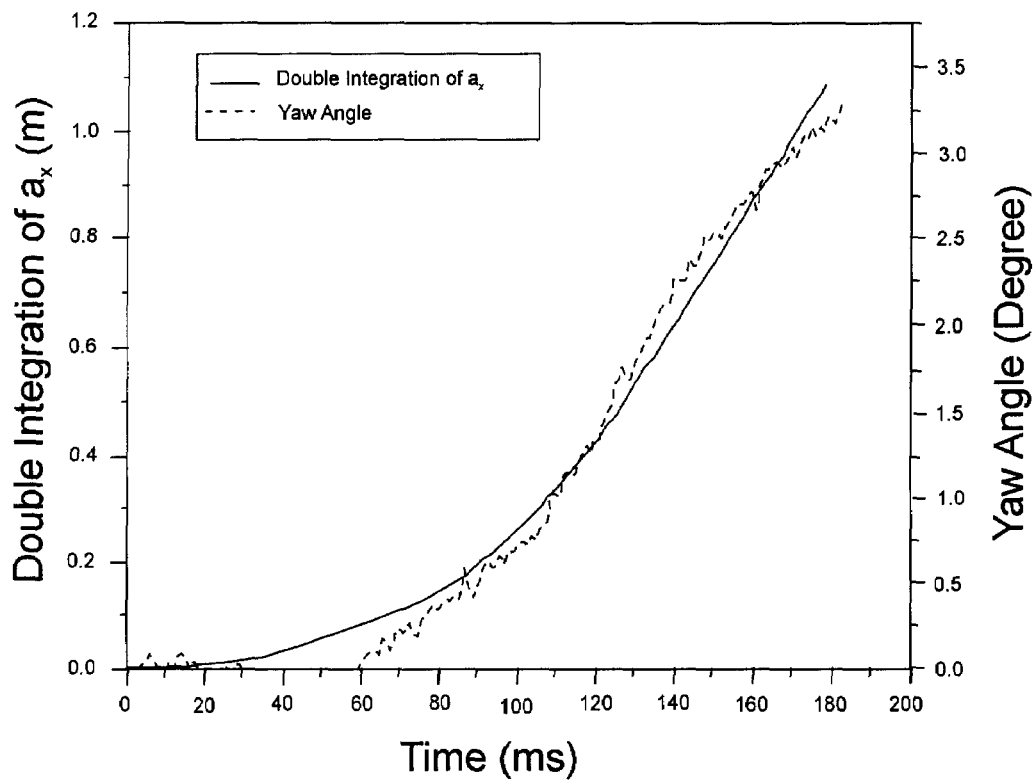
FIG. 4 shows example data used to determine the validity of derived relationships describing the movement of the vehicle of FIGS. 1a and 1b.

FIG. 4 shows a example plot of yaw angle, in degrees, and the double integration of $a_x$, in meters, versus time, in milliseconds. The match between the two curves validates (16). r is equal to the ratio of the two Y-axis scales.

Figure 5:
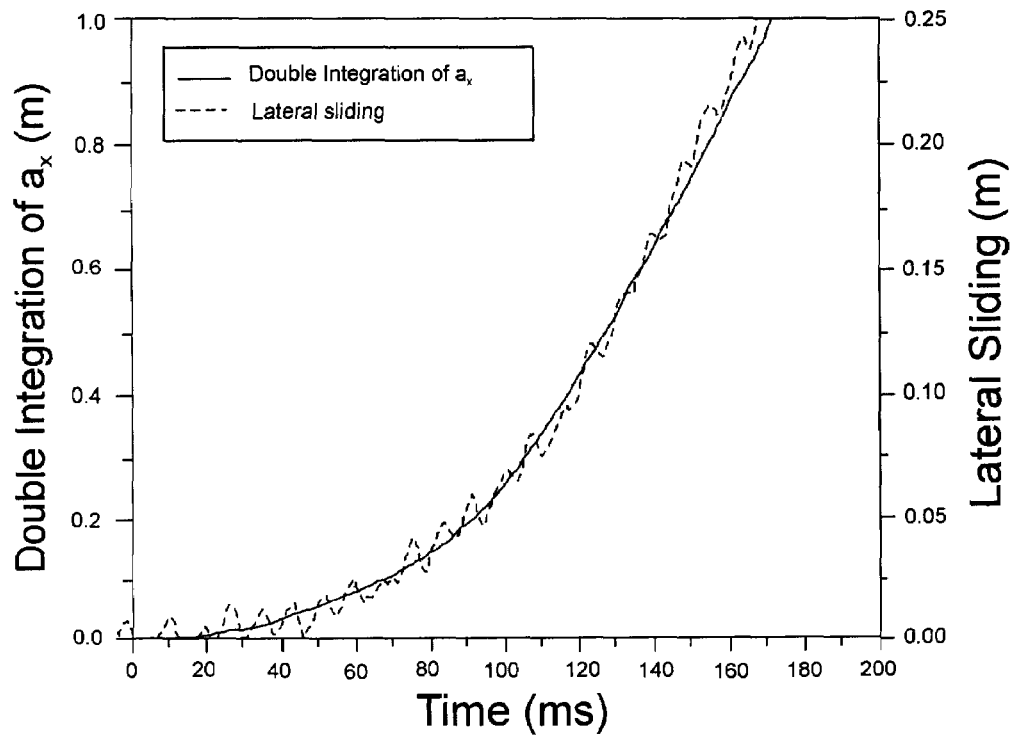
FIG. 5 shows example data used to determine the validity of derived relationships describing the movement of the vehicle of FIGS. 1a and 1b.

FIG. 5 shows a plot of lateral sliding, in meters, and the double integration of $a_x$, in meters, versus time, in milliseconds. The match between the two curves validates (17). C is equal to the ratio of the two Y-axis scales.

Figure 6A:
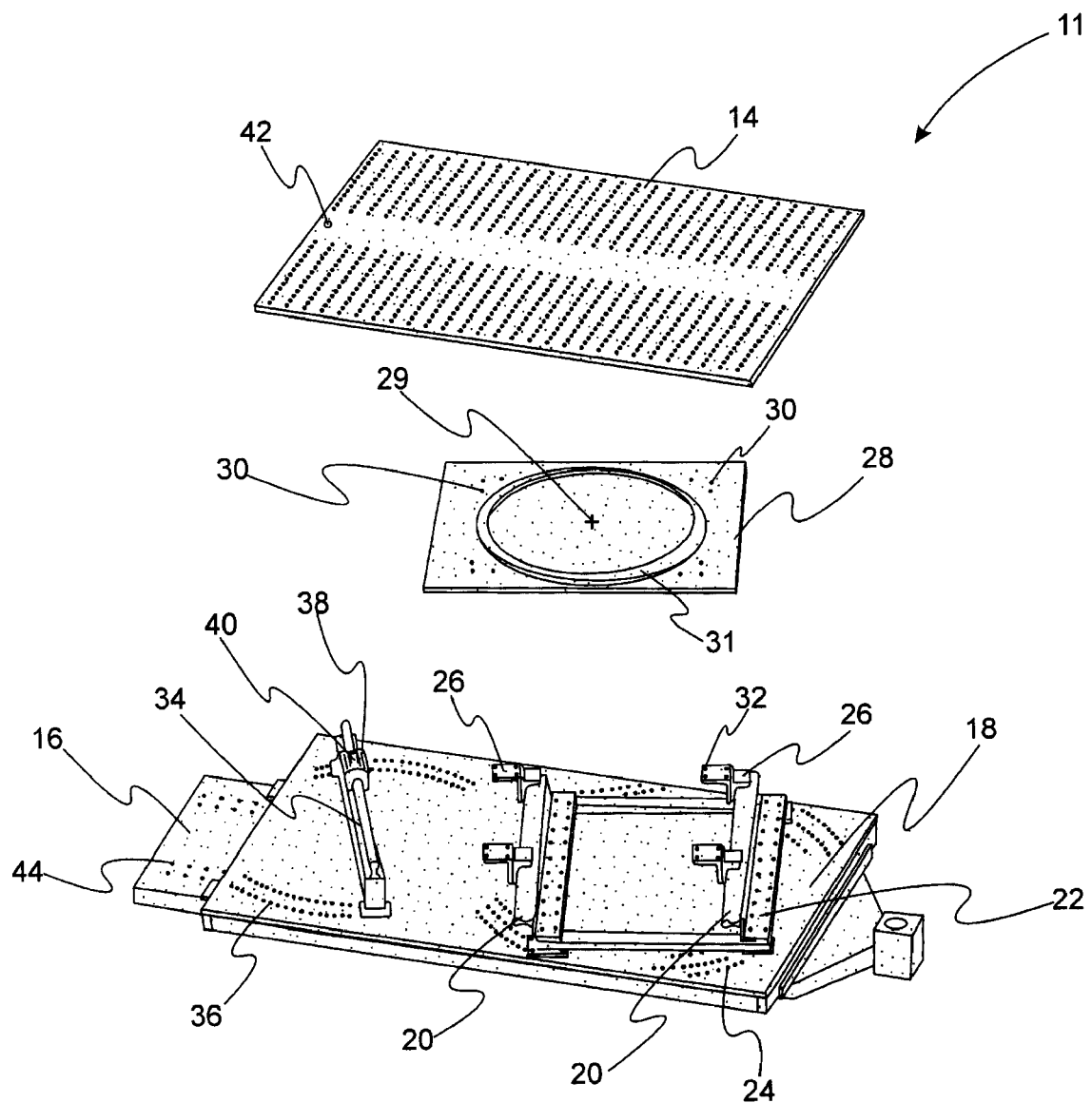
FIG. 6a shows an exploded perspective view of a track and guide rail sled back testing system in accordance with an embodiment of the invention.

FIG. 6*a* shows an exploded view of a portion of track and guide rail sled buck testing system 11. System 11 includes platform 14, sled carriage 16, and base plate 18. Tracks 20 are mounted to track mounting structure 22. Track mounting structure 22 is attached with base plate 18 via mounting holes 24. Mounting holes 24 are configured such that track mounting structure 22 and thus tracks 20 are adjustable relative to base plate 18 through a range of angles as will be described in detail below. Tracks 20 include track sliders 26 that move along tracks 20. Circular bearing plate 28, having a center of rotation 29, is attached to track sliders 26 via bearing plate mounting holes 30 and track slider mounting holes 32.

Guide rail 34 is attached to base plate 18 via guide rail mounting holes 36. Guide rail mounting holes 36 are configured such that guide rail 34 is adjustable relative to base plate 18 through a range of angles as will be explained in detail below. Guide rail 34 includes guide rail slider 38, which moves along guide rail 34, and pivot 40. Pivot 40 is connected with platform 14 at pivot mount 42. Pivot mount 42 allows platform 14 to pivot about pivot 40.

Guide rail 34 need not be straight. Guide rail 34 may be curved or bent, e.g., tuned, such that movement of platform 14 about pivot 40 simulates a desired vehicle behavior.

Base plate 18 is connected with carriage 16, e.g., bolted, via carriage mounting holes 44. Platform 14 is mechanically connected with circular bearing 31. Circular bearing 31 is mechanically connected with circular bearing plate 28.

Figure 6B:
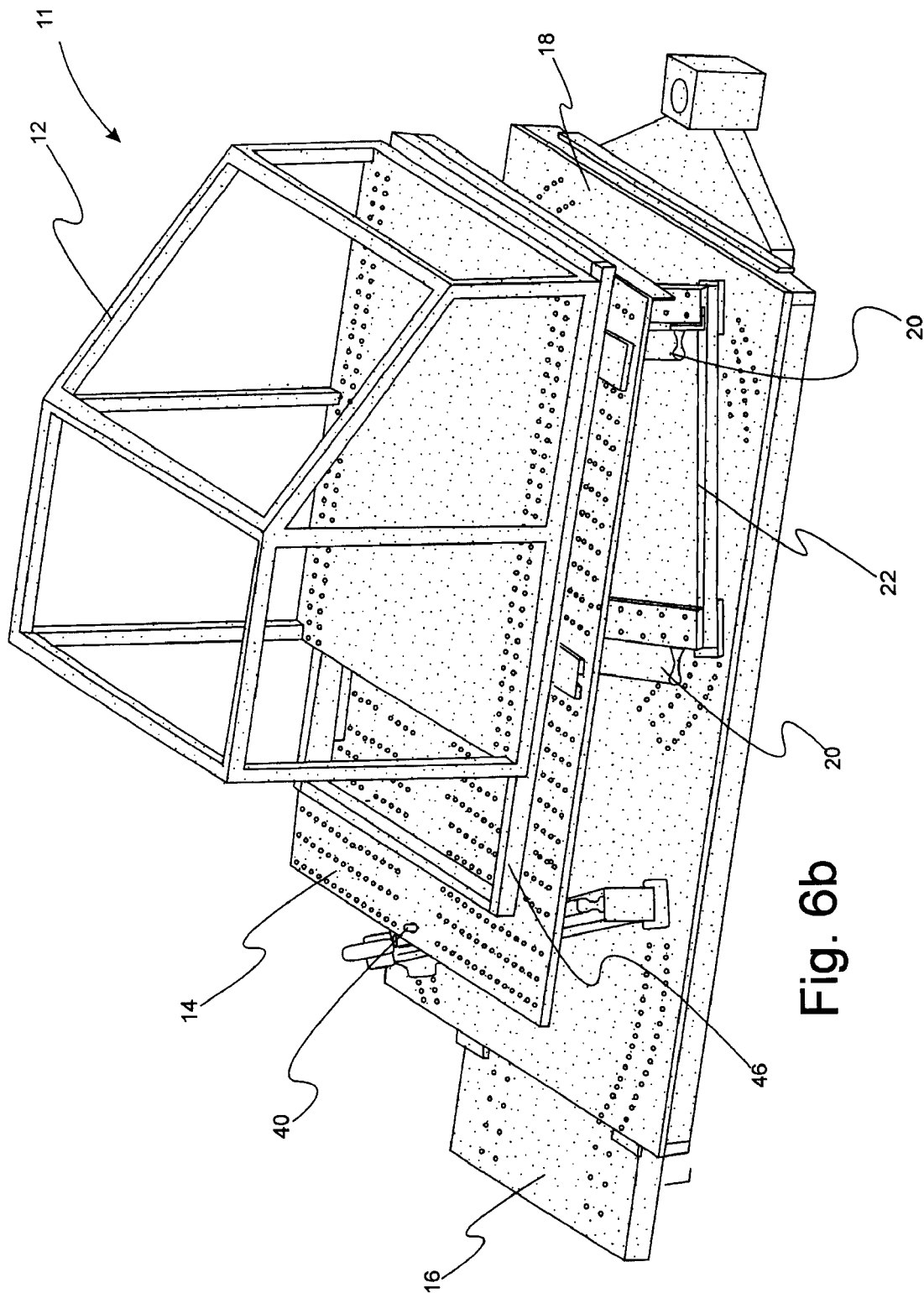

FIG. 6b shows an assembled view of system 11. Buck mounting structure 46 may be used to facilitate the connection of buck 12 with platform 14 as shown. Buck 12 and platform 14 have a center of gravity, C.G. A is assembled, center of gravity C.G. is aligned with center of rotation 29.

Figure 7:
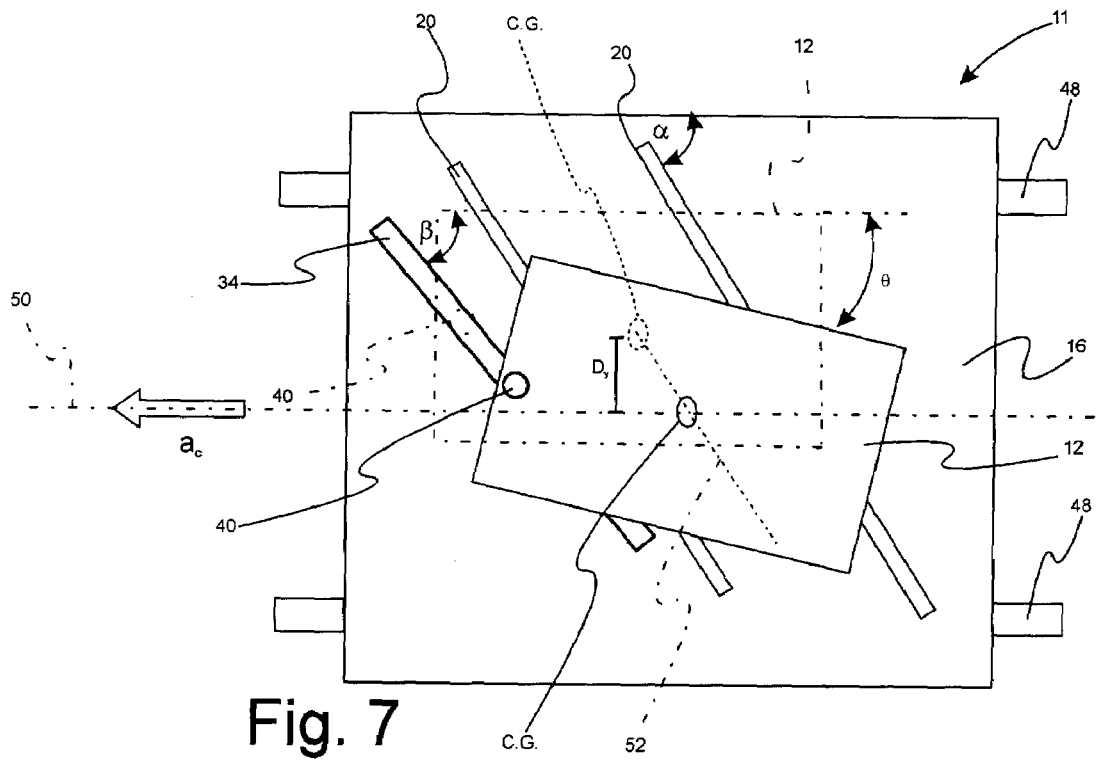
FIG. 7 shows a plan view of the track and guide rail sled buck testing system of FIG. 6b before and after acceleration.

FIG. 7 shows a model of system 11. Sled carriage 16 travels along carriage rails 48 in the direction of carriage axis 50. FIG. 7 shows the position of buck 12 before and after acceleration. α is the angle between carriage axis 50 and tracks 20 and β is the angle between carriage axis 50 and guide rail 34.

FIGS. 8a through 8e show models of the movement and the forces acting on system 11 where $m_s$: mass of sled buck 12
$m_p$: mass of the platform 14 and sled buck 12
R: Radius of gyration of sled buck 12
$I_o$: Moment of inertia about the center of rotation, o
$a_c$: Applied acceleration on sled carriage 16, and
C.G.: Center of gravity of platform 14 and sled buck 12.

Figure 8A:
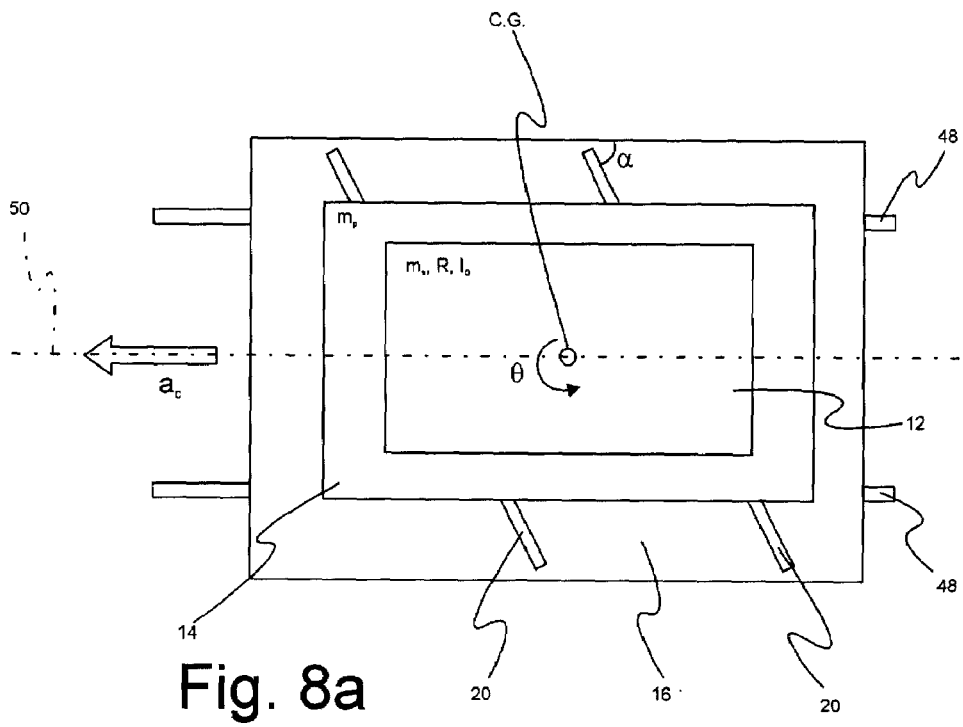
Figure 8B:
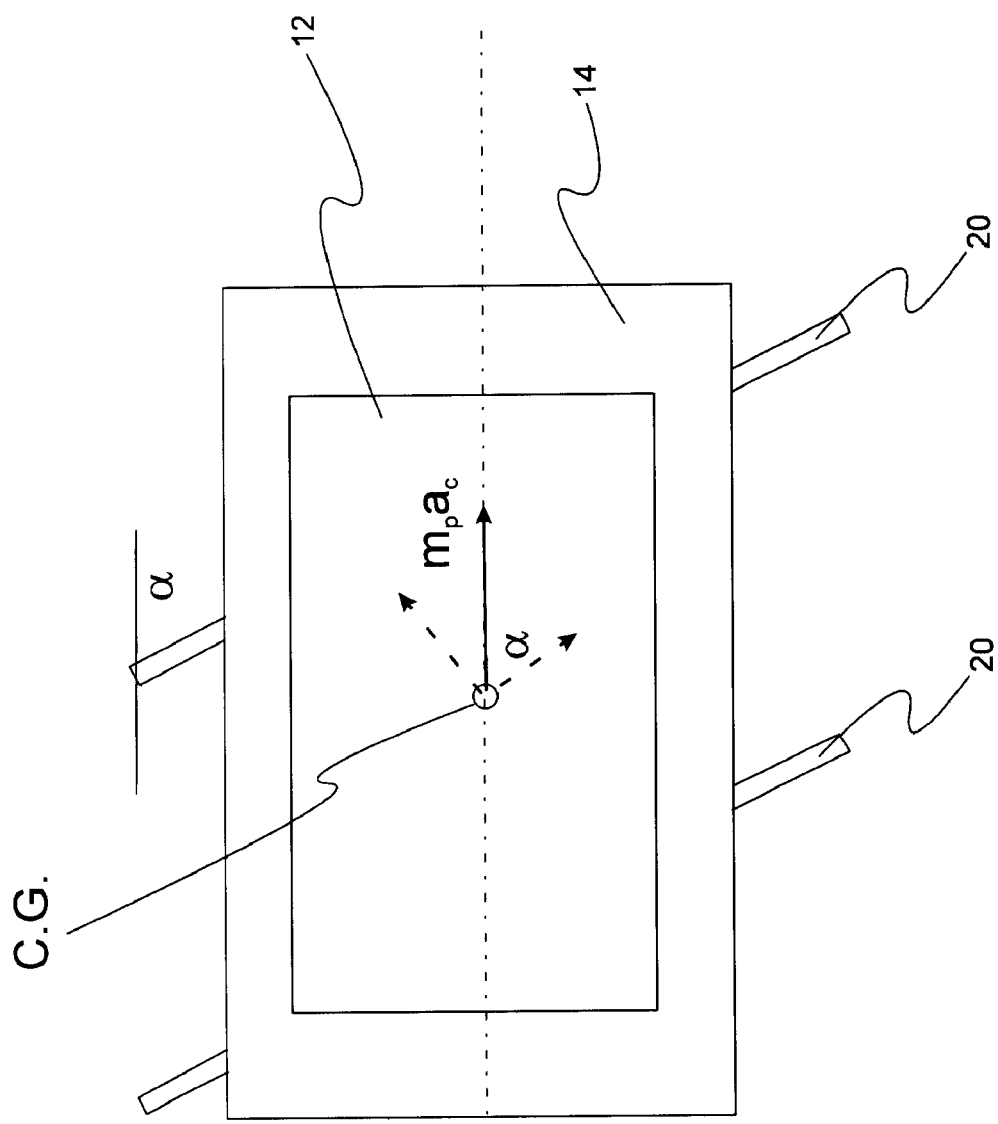

Referring to FIG. 8b, the equations of motion in the direction of tracks 20 is given by $$m_p a_c \cos\alpha = m_p a_t. \tag{23}$$

Decomposing $a_t$ into two components yields $$a_x^P = a_t \cos\alpha = a_c \cos^2\alpha \tag{24}$$

and $$a_y^P = a_t \sin\alpha = a_c \sin\alpha \cos\alpha \tag{25}$$

Figure 8C:
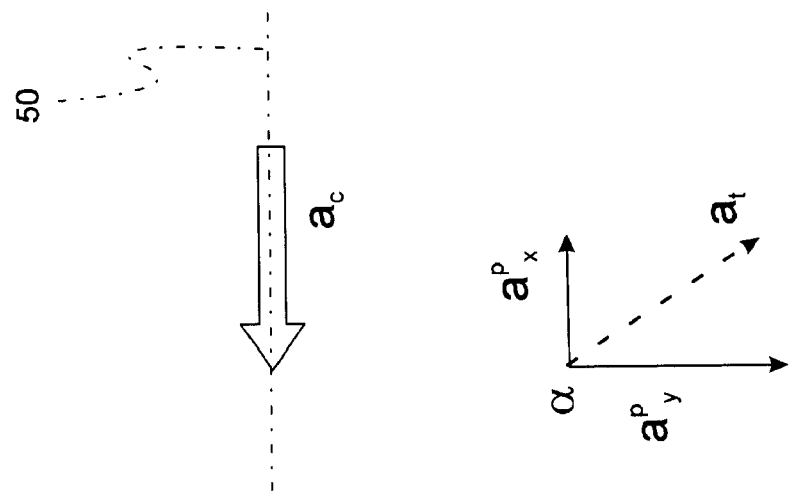

Referring to FIG. 8c, at the C.G., $$a_x = a_c - a_x^P = a_c \sin^2\alpha \tag{26}$$

and $$a_y = a_c \sin\alpha \cos\alpha \tag{27}$$

Solving (26) and (27) for $a_c$, $a_x$, and $a_y$ yields $$a_c = \frac{1}{\sin^2\alpha} a_x \tag{29}$$

and $$a_y = \frac{\cos\alpha}{\sin\alpha} a_x.$$

Because $$a_y = C a_x, \tag{30}$$

$$\tan\alpha = \frac{1}{C}. \tag{31}$$

Figure 8D:
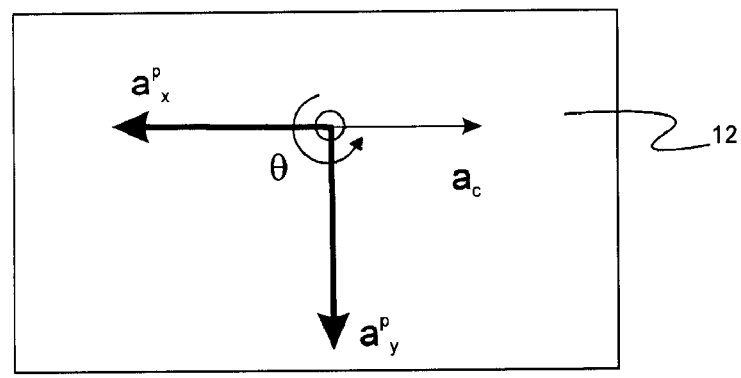
Figure 8E:
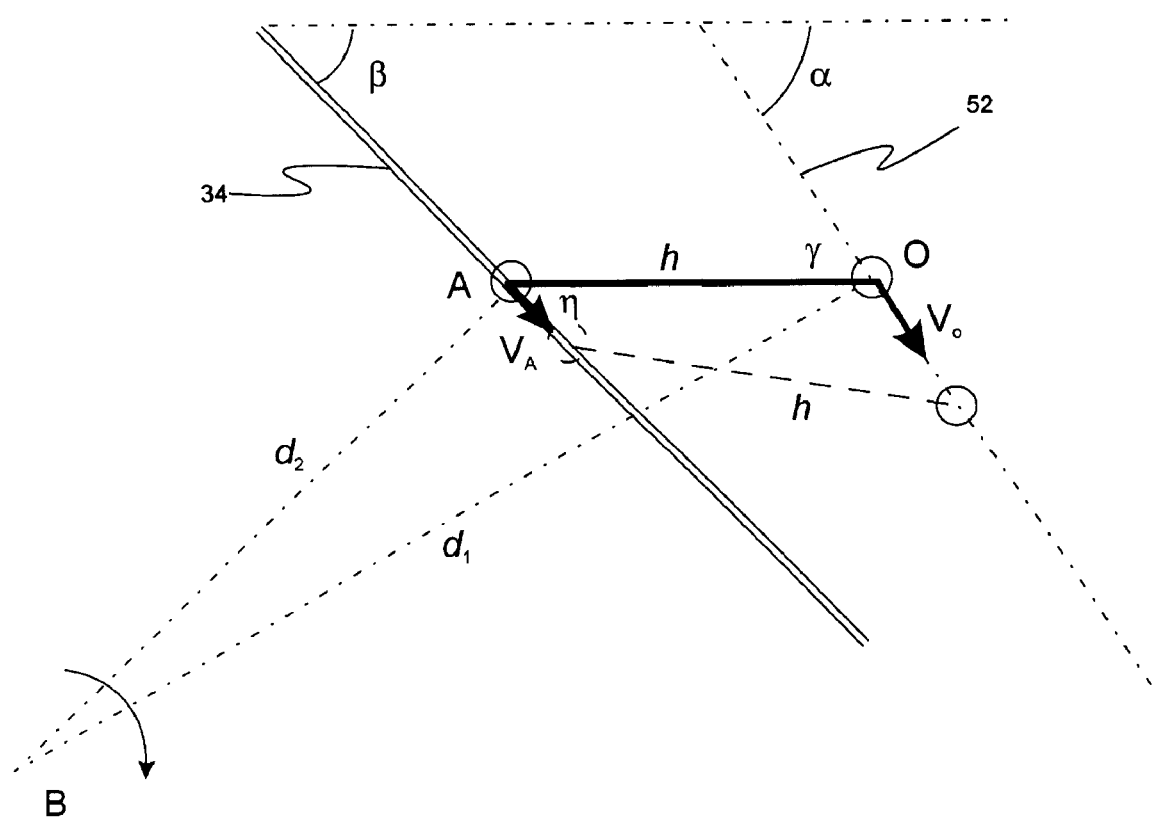

Referring to FIG. 8d and noting that length h remains constant $$V_o \cos\gamma - V_A \cos\eta = 0 \tag{32}$$

where $$V_o = d_1 \dot\theta \tag{33}$$

and $$V_A = d_2 \dot\theta. \tag{34}$$

Rotation of the line OA yields $$V_o \sin\gamma - V_A \sin\eta = h\dot\theta. \tag{35}$$

Also, $$V_O = \frac{V_y}{\sin\alpha} = \frac{Cr}{\sin\alpha} \dot\theta \tag{36}$$

and $$\gamma = \alpha - \beta + \eta. \tag{37}$$

(32)-(37) yield $$\beta = \alpha - \gamma + \Delta \tag{38}$$

where $$\Delta = \tan^{-1}\left(\tan\gamma - \frac{h\sin\alpha}{Cr\cos\gamma}\right). \tag{39}$$

If γ=α (by selecting location A), $$\beta = \tan^{-1}\left(\left(1 - \frac{h}{Cr}\right)\tan\alpha\right). \tag{40}$$

In summary, $$\alpha = \tan^{-1}\left(\frac{1}{C}\right), \tag{41}$$

$$\beta = \tan^{-1}\left(\left(1 - \frac{h}{Cr}\right)\tan\alpha\right), \text{ and} \tag{42}$$

$$a_c = \frac{1}{\sin^2\alpha} a_x. \tag{28}$$

Example values for the above variables are
r≈15,
C≈0.25,
h≈2.0,
α≈75°, and
β≈60°.

Upon acceleration of carriage 16 by acceleration pulse, $a_p$, sled buck 12 and platform 14 will move relative to carriage 16. In particular, sled buck 12 and platform 14 will translate relative to carriage 16 as governed by (17) and sled buck 12 and platform 14 will rotate about center of rotation 29 and pivot 40 as governed by (16).

Figure 9A:
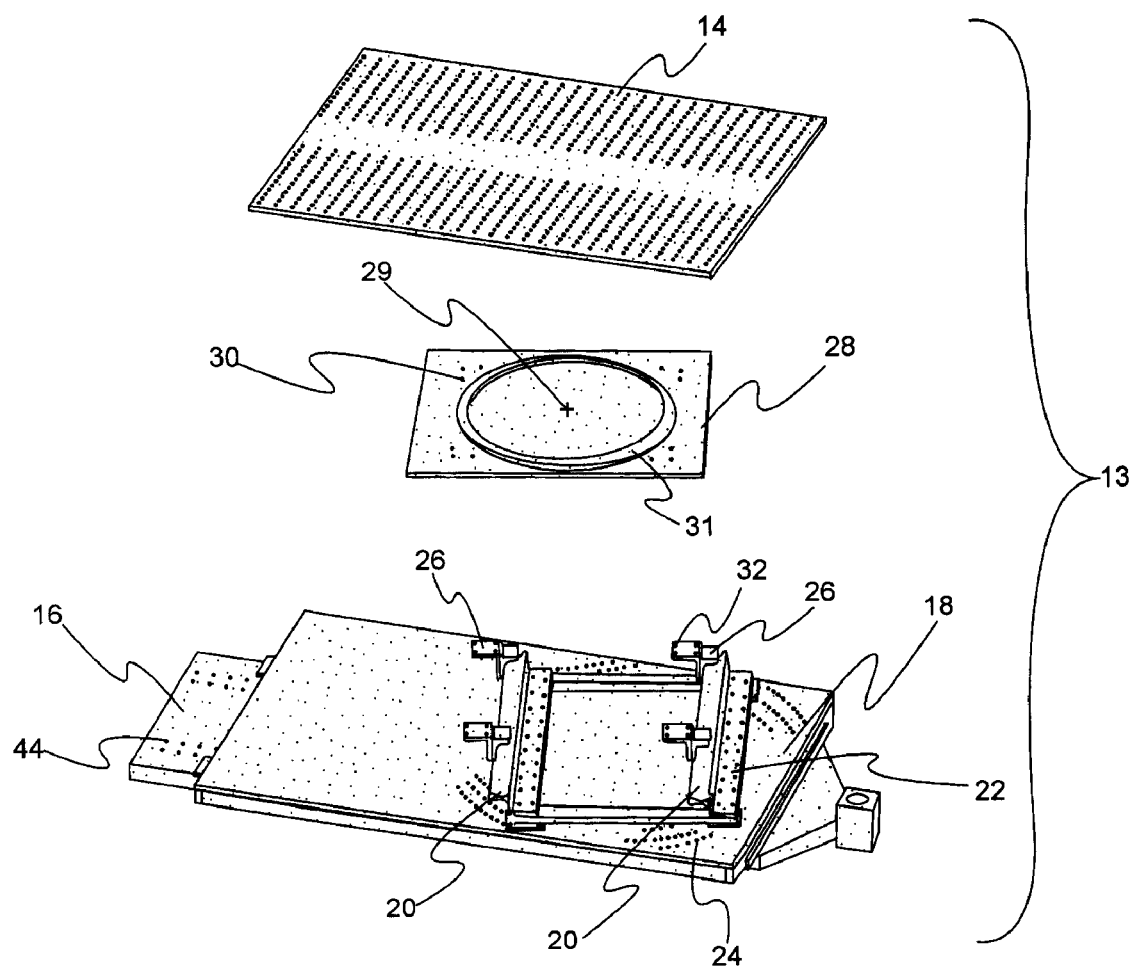
FIG. 9a shows an exploded perspective view of a track sled buck testing system in accordance with an embodiment of the invention.

FIG. 9a shows an exploded view of track sled buck testing system 13. System 13 includes platform 14, sled carriage 16, and base plate 18. Tracks 20 are mounted to track mounting structure 22. Track mounting structure 22 is attached with base plate 18 via mounting holes 24. Mounting holes 24 are configured such that track mounting structure 22, and thus tracks 20, are adjustable relative to base plate 18 through a range of angles as will be described in detail below. Tracks 20 include track sliders 26 that move along tracks 20. Circular bearing plate 28, having a center of rotation 29, is attached to track sliders 26 via bearing plate mounting holes 30 and track slider mounting holes 32.

Base plate 18 is connected with carriage 16, e.g., bolted, via carriage mounting holes 44. Platform 14 is mechanically connected with circular bearing 31. Circular bearing 31 is mechanically connected with circular bearing plate 28.

Figure 9B:
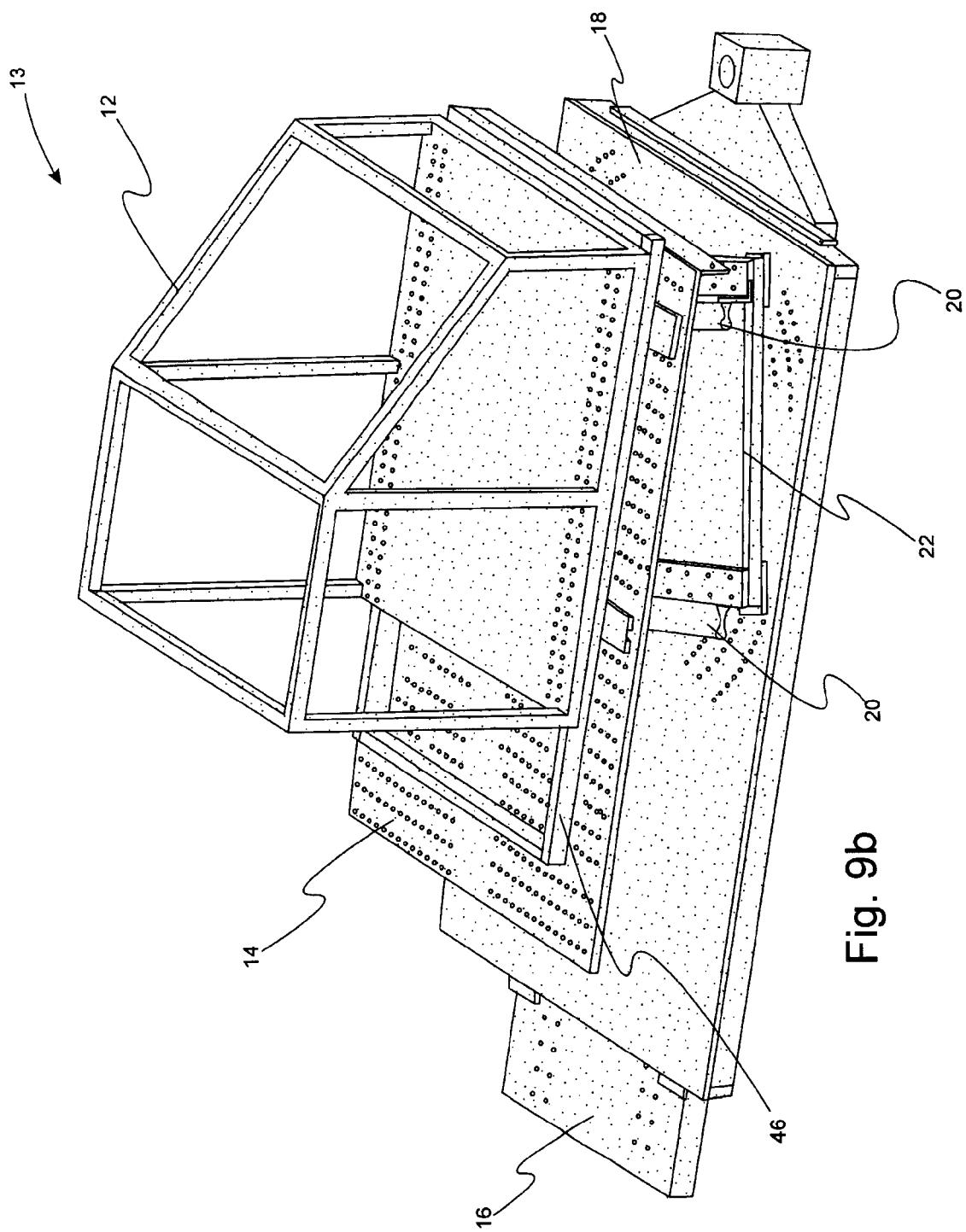

FIG. 9b shows an assembled view of system 13. Buck mounting structure 46 may be used to facilitate the connection of buck 12 with platform 14 as shown. Buck 12 and platform 14 have a center of gravity, C.G. As assembled, the center of gravity, C.G., is not aligned with center of rotation 29 as will be explained in detail below.

FIGS. 10a through 10d show models of the movement of and the forces acting on system 13, where:
$m_s$: mass of sled buck 12
$m_p$: mass of the platform 14 and sled buck 12
R: Radius of gyration of sled buck 12
$I_o$: Moment of inertia about the center of rotation 29, and
$a_c$: Applied acceleration on carriage 16.

Figure 10A:
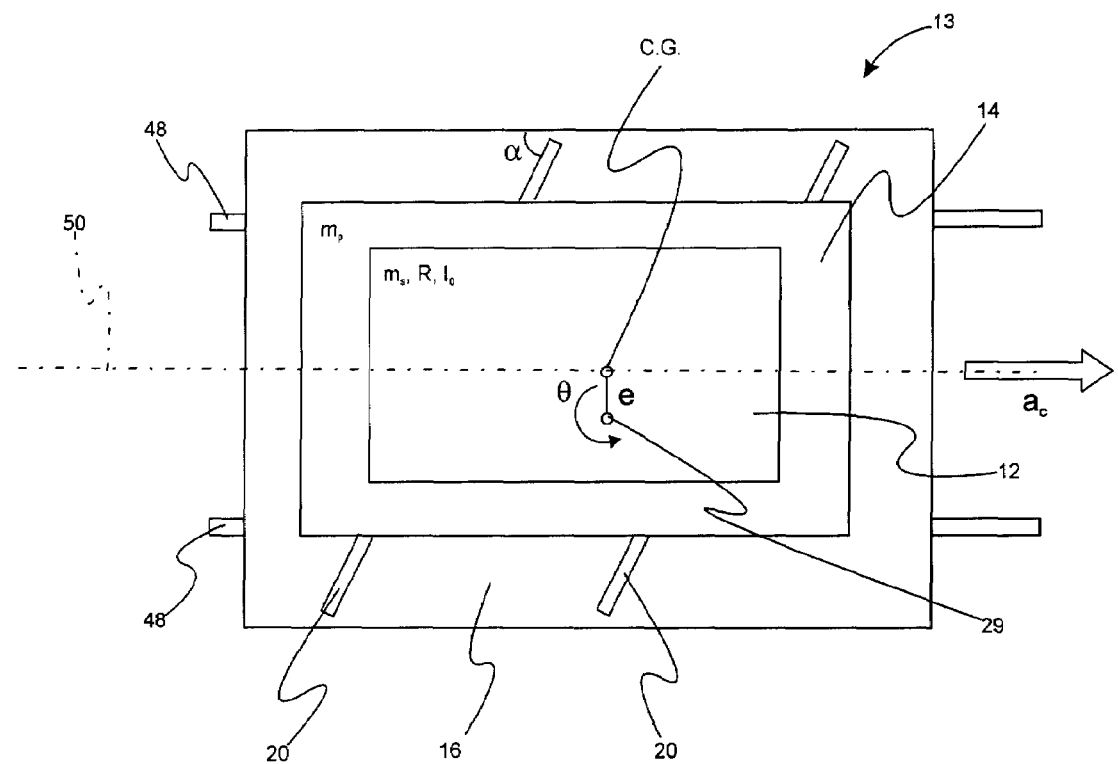
Figure 10B:
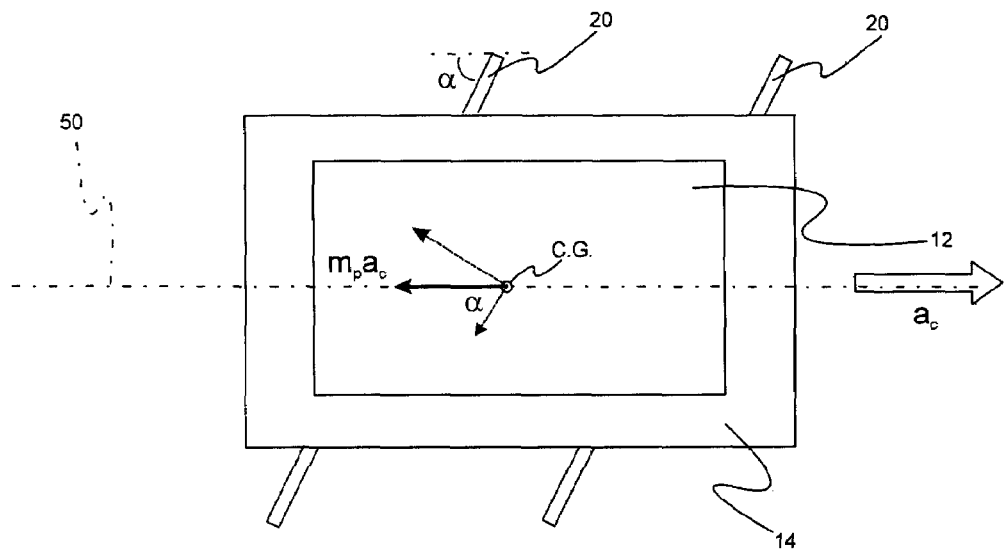
Figure 10C:
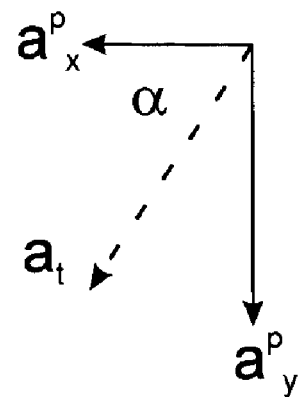

Referring to FIGS. 10b and 10c, the equations of motion in the direction of tracks 20 is $$m_p a_c \cos \alpha \approx m_p a_t \quad (43)$$

Decomposing $a_t$ into two components yields $$a_x^P = a_t \cos \alpha = a_c \cos^2 \alpha \quad (44)$$

and $$a_y^P = a_t \sin \alpha = a_c \sin \alpha \cos \alpha. \quad (45)$$

Figure 10D:
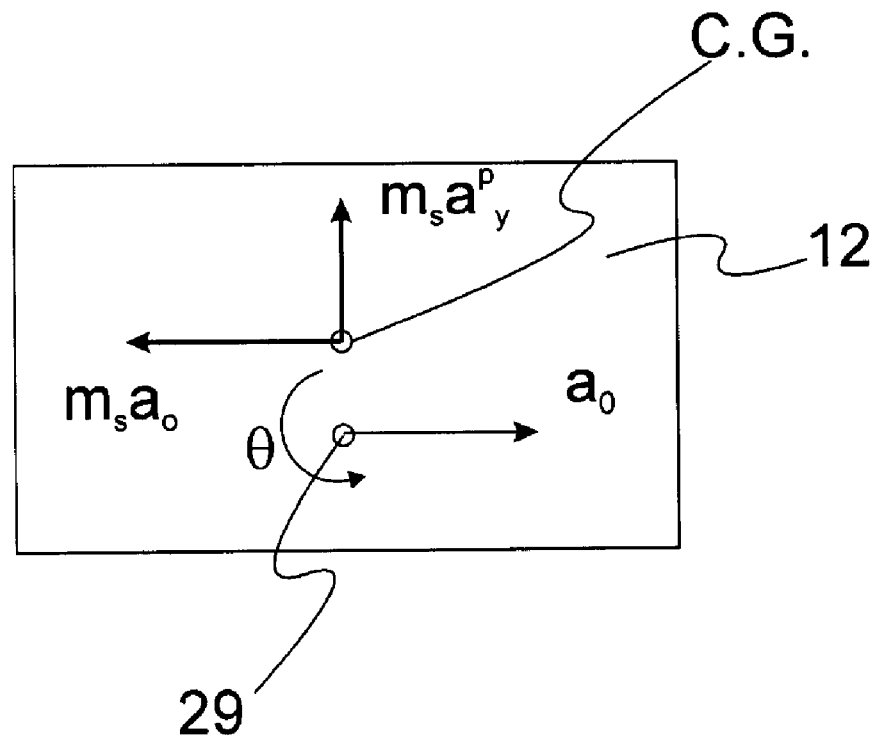

Referring to FIG. 10d, at the C.G. of buck 12, $$a_x^o = a_c - a_x^P = a_c \sin^2 \alpha. \quad (46)$$

The equation of motion about the center of rotation 29 is given by $$m_s a_c e \sin^2 \alpha = (m_s R^2 + m_s e^2) \ddot{\theta}. \quad (47)$$

The longitudinal acceleration at the C.G. is given by $$a_x = a_x^o - e\ddot{\theta} = a_c \sin^2 \alpha - e\ddot{\theta}. \quad (48)$$

Solving (47) and (48) for $a_c$ and $a_x$ yields $$a_c = \frac{R^2 + e^2}{R^2 \sin^2 \alpha} a_x \quad (49)$$

and $$a_x = \frac{R^2}{e} \ddot{\theta}. \quad (50)$$

From above $$a_x = r\ddot{\theta}. \quad (51)$$

Thus, $$e = \frac{R^2}{r}. \quad (52)$$

Also, $$a_y = a_y^o = a_y^P = a_c \sin \alpha \cos \alpha. \quad (53)$$

Because $$a_y = C a_x, \quad (54)$$

thus, $$C = \frac{(R^2 + e^2) \cos \alpha}{R^2 \sin \alpha}. \quad (55)$$

Rearranging (55) yields $$\tan \alpha = \frac{R^2 + r^2}{r^2 C}. \quad (56)$$

Referring to FIG. 10a, $$e = \frac{R^2}{r}, \quad (52)$$

$$\tan \alpha = \frac{R^2 + r^2}{r^2 C}, \text{ and} \quad (56)$$

$$a_c = \frac{R^2 + e^2}{R^2 \sin^2 \alpha}. \quad (49)$$

Example values for the above variables are
$r \approx 15$,
$R \approx 0.5$,
$C \approx 0.25$,
$\alpha \approx 75°$,
$e \approx 0.02$, and
$a_c \approx 1.08 a_x$.

Upon acceleration of carriage 16 by acceleration pulse, $a_p$, sled buck 12 and platform 14 will move relative to carriage 16. In particular, sled buck 12 and platform 14 will translate relative to carriage 16 as governed by (17) and sled buck 12 and platform 14 will rotate about center of rotation 29 as governed by (16).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for sled buck testing comprising:
    a sled carriage configured to move in a direction of an axis;
    a guide attached with the sled carriage;
    a pivot member configured to move along the guide;
    first and second tracks attached with the sled carriage;
    a circular bearing member, having a center of rotation, attached with the first and second tracks, the first and second tracks configured to permit the circular bearing member to move along the first and second tracks;
    a platform attached with the circular bearing member and pivot member; and
    a sled buck attached with the platform, wherein, upon acceleration of the sled carriage, the sled buck and platform move relative to the sled carriage in a predetermined fashion, wherein the platform and sled buck have a center of gravity, and wherein the center of rotation is aligned with the center of gravity.

2. The system of claim 1 wherein, upon acceleration of the sled carriage, the sled buck and platform translate in a direction different than the direction of the axis.

3. The system of claim 2 wherein the translation depends on an angle between the first track and the axis.

4. The system of claim 3 wherein an angle between the guide and the axis depends on the angle between the first track and the axis.

5. The system of claim 1 wherein, upon acceleration of the sled carriage, the sled buck and platform rotate about the center of gravity.

6. The system of claim 5 wherein the rotation depends on an angle between the guide and the axis.

7. The system of claim 5 wherein the rotation depends on an angle between the first track and the axis.

8. The system of claim 1 wherein the guide is tunable.

9. The system of claim 1 wherein the platform pivots about the pivot member.

10. A system for sled buck testing comprising:
a sled carriage configured to move in a direction of an axis;
first and second tracks attached with the sled carriage;
a circular bearing member, having a center of rotation, attached with the first and second tracks, the first and second tracks configured to permit the circular bearing member to move along the first and second tracks;
a platform attached with the circular bearing member; and
a sled buck attached with the platform, wherein, upon acceleration of the sled carriage, the sled buck and platform move relative to the sled carriage in a predetermined fashion, wherein the platform and the sled buck have a center of gravity, and wherein the center of rotation has a predetermined lateral offset relative to the center of gravity.

11. The system of claim 10 wherein, upon acceleration of the sled carriage, the sled buck and platform translate in a direction different than the direction of the axis.

12. The system of claim 11 wherein the translation depends on an angle between the first track and the axis.

13. The system of claim 10 wherein the first and second tracks are parallel.

14. The system of claim 10 wherein, upon acceleration of the sled carriage, the sled buck and platform rotate about the center of rotation.

15. The system of claim 14 wherein the rotation depends on the lateral offset.

* * * * *